(12) United States Patent
Shirey et al.

(10) Patent No.: US 9,120,435 B2
(45) Date of Patent: Sep. 1, 2015

(54) WIRE HARNESS PROTECTOR

(75) Inventors: Christa L. Shirey, Garden City, MI (US); Yuko H. Miki, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 153 days.

(21) Appl. No.: 13/478,713

(22) Filed: May 23, 2012

(65) Prior Publication Data
US 2013/0313376 A1    Nov. 28, 2013

(51) Int. Cl.
*H01B 7/00* (2006.01)
*B60R 16/02* (2006.01)
*H02G 3/04* (2006.01)

(52) U.S. Cl.
CPC ......... *B60R 16/0215* (2013.01); *B60R 16/0207* (2013.01); *H02G 3/0437* (2013.01)

(58) Field of Classification Search
CPC .......... B60R 16/0215; B60R 16/0207; H02G 11/006
USPC ........... 248/74.3, 73, 71, 65; 174/72 A, 71 R, 174/72 R, 68.1, 68.3; 138/110, 151, 156
See application file for complete search history.

(56) References Cited

U.S. PATENT DOCUMENTS

| | | | |
|---|---|---|---|
| 6,206,331 B1 | 3/2001 | Keith et al. | |
| 6,354,651 B1 | 3/2002 | Mori | |
| 7,075,011 B1 * | 7/2006 | Kogure et al. | 174/72 A |
| 7,297,871 B2 * | 11/2007 | Watanabe et al. | 174/72 A |
| 7,375,281 B2 * | 5/2008 | Kogure et al. | 174/72 A |
| 7,980,518 B2 | 7/2011 | Katou et al. | |
| 2005/0241715 A1 * | 11/2005 | Suzuki et al. | 138/110 |
| 2008/0210828 A1 | 9/2008 | Kogure et al. | |
| 2010/0230157 A1 * | 9/2010 | Sakata et al. | 174/72 A |
| 2010/0236826 A1 * | 9/2010 | Suzuki | 174/72 A |
| 2011/0017878 A1 * | 1/2011 | Billard et al. | 248/65 |
| 2012/0217033 A1 * | 8/2012 | Agusa | 174/68.3 |
| 2013/0292159 A1 * | 11/2013 | Gotou et al. | 174/250 |

* cited by examiner

*Primary Examiner* — Todd M Epps
(74) *Attorney, Agent, or Firm* — Dinsmore & Shohl LLP

(57) ABSTRACT

A wire harness holder for securing a wire harness to a panel. The wire harness holder includes a body including a fastening portion to fasten the body to the panel, a channel to receive the wire harness therein. The channel extends in a serpentine configuration so as to form a drip loop portion therein and is defined by a pair of opposed side walls connected by a bottom wall. The body further includes means for facilitating retention of the wire harness within the body.

18 Claims, 3 Drawing Sheets

WIRE HARNESS PROTECTOR

BACKGROUND

1. Field of the Invention

The present invention generally relates to wire harnesses. More specifically, the invention relates to an article for securing a wire harness to a panel and protecting the wire harness both during and after installation.

2. Description of Related Art

Wire harnesses are used in automotive vehicles to collectively route conductors to various components of the vehicle while allowing for greater installation efficiencies by packaging the conductors in a single structure. However, if the wire harnesses are merely loosely strung throughout the vehicle, they can be impinged, kinked or damaged their installation or during the installation of other components.

To secure wire harnesses to the interior surfaces of various body panels, releasable clips are often used. Wire harness clips have typically included a fastener formed in conjunction with the means to retain the wire harness with the clip. The fastener itself is adapted to be interlockingly inserted into an opening in the panel of the vehicle. One such type of fastener is the well-known Christmas tree fastener. To retain the wire harness to the clip, the clip may be provided with a ratchet-type lock, whereby a strap wraps around the wire harness and releasably engages with another portion of the lock. Another means by which wire harnesses are retained in the clips is by means of a taping provision or feature. Taping features usually are in the form of a rigid tab extending from the clip. The tab allows the wire harness to be positioned along the clip and secured thereto by the wrapping tape around both the wire harness and the tab.

If the wire harness is required to have a particular shape due to a given installation, the wire harness must be taped to a portion of the clip, manually shaped into the desired configuration, and further taped to the clip in an effort to retain the wire harness in the desired configuration. As such, the clip is a planar piece of plastic in a particular shape, such as L-shape. In addition to this installation process being labor-intensive, the clips are subject to breakage from being tugged on during installation. Furthermore, the wire harness might eventually lose its shape as a result of the vibrations imparted throughout the vehicle during its operation and the tape coming off of an end of the clip.

Accordingly, the more robust article that allows for the ready configuration of a wire harness into a desired shape is needed.

SUMMARY

In order to address the above need, a wire harness holder is provided that minimizes kinking or pinching of the wire harness during installation, has the capacity to hold a larger wire harnesses, and specifically orients the wire harness into a desired configuration such as a drip loop being formed in the wire harness. A wire harness holder embodying the principles of the present invention lends itself for use in automotive vehicle applications where a portion of the wire harness may be susceptible to environmental factors, such as wet weather. One such location for a wire harness in an automotive vehicle is in the door the vehicle. In this type of installation, the wire harness may provide wire leads to various components mounted to the door, including door lock switches, window switches and window regulators.

In one aspect of the invention, a wire harness holder for securing a wire harness to a panel includes: a body including a fastening portion to fasten the body to the panel, a channel to receive the wire harness therein, the channel extending in a serpentine configuration so as to form a drip loop portion therein, the channel being defined by a pair of opposed side walls connected by a bottom wall, the channel further being open along a side opposite of the bottom wall, the body further including retention means for facilitating retention of the wire harness within the body.

In another aspect of the invention, the serpentine configuration forming the drip loop includes a first bend and a second bend.

In a further aspect of the invention, the second bend generally reverses a direction defined by the first bend.

In an additional aspect of the invention, the first bend forms a bend of about 90° bend and the second bend forms a bend of about 180°.

In yet another aspect of the invention, the first bend includes portions defining a drainage opening.

In a still further aspect of the invention, the retention means includes a securement provision located at one end of the channel.

In an additional aspect of the invention, the securement provision includes a wall having a protruding lip and a recessed edge adjacent to the protruding lip, the recessed edge being located between the lip and the channel.

In still another aspect of the invention, a second securement provision is provided at an opposing end of the channel.

In yet a further aspect of the invention, the securement provision is formed by a pair of angled walls, at least one of the walls including a protruding lip and a recessed edge adjacent to the protruding lip, the recessed edge being located between the lip and the channel In another aspect of the invention, the walls are generally perpendicularly oriented walls.

In a further aspect of the invention, the fastening portion includes a pair of resiliently flexible tangs projecting in a direction generally away from the open side of the channel.

In an additional aspect of the invention, the body is configured such that the drip loop portion of the channel is positioned vertically lower than an adjacent portion of the channel when the body is in an installed position secured to the panel.

In a still further aspect of the invention, the retentions means includes a unitarily formed retention strap, the retention strap being connected to one side wall of the channel via a live hinge and being releasably engageable with the other side wall of the channel so as to extend over the open side of the channel.

In another aspect of the invention, a wire harness holder for securing a wire harness to a panel is provided in which a body includes a fastening portion to fasten the body to the panel, a channel to receive the wire harness therein, and first and second securement provisions to secure the wire harness to the body, the channel extending between the first and second securement provisions in a serpentine configuration forming a drip loop, the channel being defined by a pair of opposed side walls connected by a bottom wall, and the channel being open along a side opposite of the bottom wall.

In a further aspect of the invention, the serpentine configuration forms a drip loop includes a first bend and a second bend, the second bend generally reversing a direction defined by the first bend.

In an additional aspect of the invention, the first bend forms a bend of about 90° bend and the second bend forms a bend of about 180°.

In still a further aspect of the invention, the first and second securement provisions include a wall having a protruding lip and a recessed edge adjacent to the protruding lip, the recessed edge being located between the lip and the channel.

In yet another aspect of the invention, the first and second securement provisions are formed by pairs of angled walls, at least one of the walls including a protruding lip and a recessed edge adjacent to the protruding lip, the recessed edge being located between the lip and the channel In an additional aspect of the invention, the body is configured such that the drip loop portion of the channel is positioned vertically lower than an adjacent portion of the channel when the body is in an installed position secured to the panel.

In a further aspect of the invention, a unitarily formed retention strap, the retention strap being connected to one side wall of the channel via a live hinge and being releasably engageable with the other side wall of the channel so as to extend over the open side of the channel.

Further objects, features and advantages of this invention will become readily apparent to persons skilled in the art after a review of the following description, with reference to the drawings and claims that are appended to and form a part of this specification.

DETAILED DESCRIPTION

Figure 1:
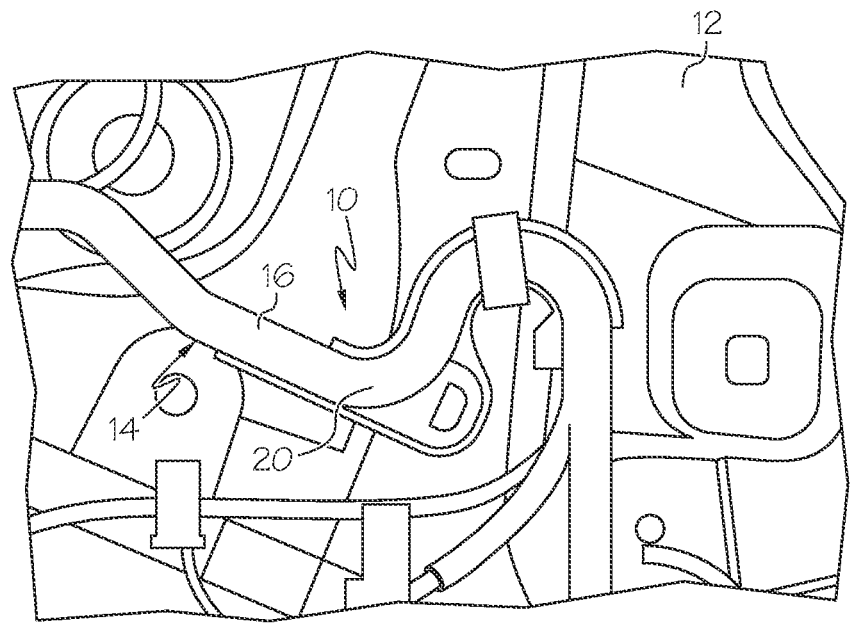
FIG. 1 is an elevational view of a wire harness holder embodying the principles of the present invention and mounted to an interior door panel of an automotive vehicle.

Referring now to the drawings, a wire harness holder embodying the principles of the present invention is illustrated therein and generally designated at 10. In FIG. 1, the wire harness holder 10 is shown mounted to a panel 12 of an automotive vehicle. More specifically, the wire harness holder 10 is illustrated as being mounted to an interior panel 12 of a vehicle's passenger door. In this illustration, the presented view is looking exteriorly from the cabin of the vehicle and, accordingly, the top of the vehicle is oriented to the top of the page and the front of vehicle is oriented to the left of the page.

Received within the wire harness holder 10 is a wire harness 14. The wire harness 14 itself is a bundle of electrical wires and leads that may be encased within a sleeve 16. The individual wires and leads of the wire harness 14 extend to various components (not shown) of the door, such as a door lock switch, a window switch and a window regulator.

Figure 2:
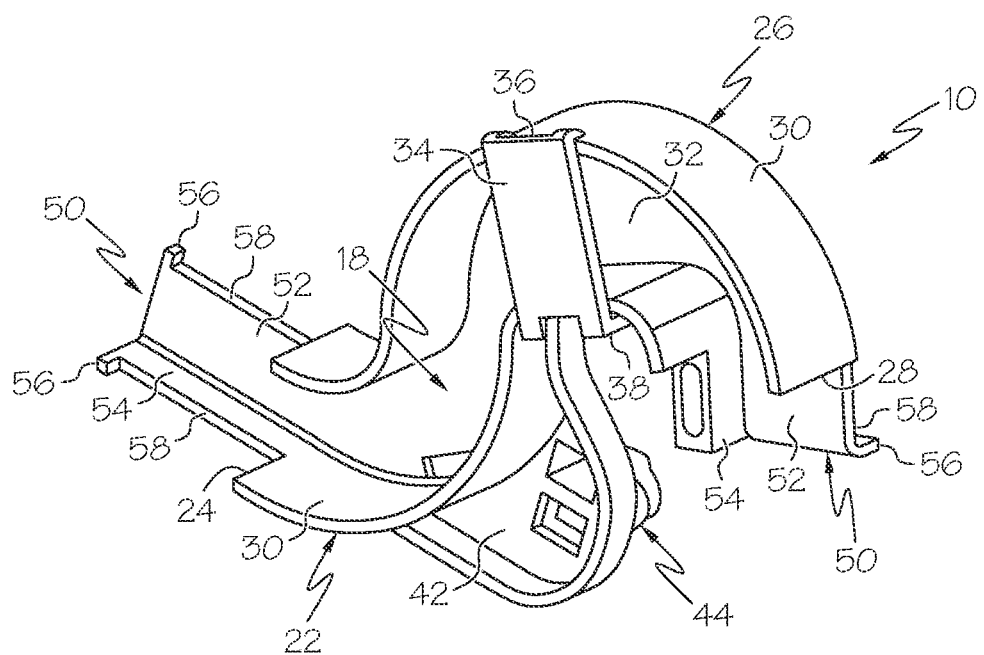
FIG. 2 is an enlarged perspective view of the wire harness holder seen in FIG. 1 wherein the holder has been isolated from the door panel and the wire harness.

As its primary component, the wire harness holder 10 includes a body having a channel 18 into which the wire harness 14 is received. The channel 18 defines a serpentine pathway that is generally of an S-shaped configuration. When mounted to the panel 12, this configuration of the channel 18 provides the wire harness 14 with a drip loop, which is generally designated at 20 in FIG. 1 and represented by a bend 22 in the channel 18, and that is provided in a lowermost location in the installed position of the wire harness holder 10. The drip loop 20 is therefore synonymous with the bend 22 seen in FIG. 2. This bend 22 of the channel 18 receives the wire harness 14 at a first end 24 of the channel 18 and causes the wire harness 14 to generally undergo a 90° upward bend. Thereafter, channel 18 may undergo a second bend 26 that causes the wire harness 14 to generally undergo a 180° downward bend and exit the channel 18 at its second end 28.

The channel 18 is generally defined by a pair of opposed sidewalls 30 that are connected to one another by a bottom wall 32. The channel 18 is open on a side opposite from the bottom wall 32. As such, the wire harness 14 can be inserted into the channel 18 through the open side opposite of the bottom wall 32, instead of having to be fed through the length of the channel 18 from the first end 24 to the second end 28.

Figure 3:
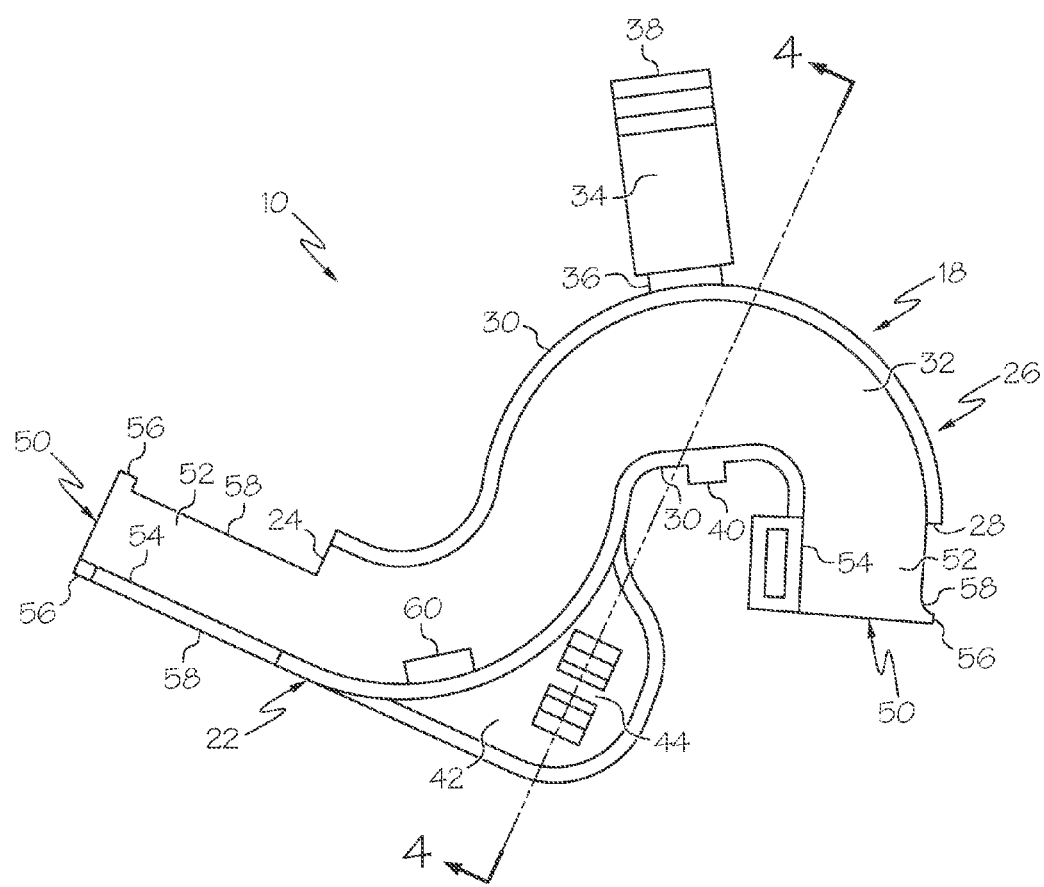
FIG. 3 is a plan view of the wire harness holder seen in FIGS. 1 and 2 and illustrated with a retention strap in the open position.
Figure 4:
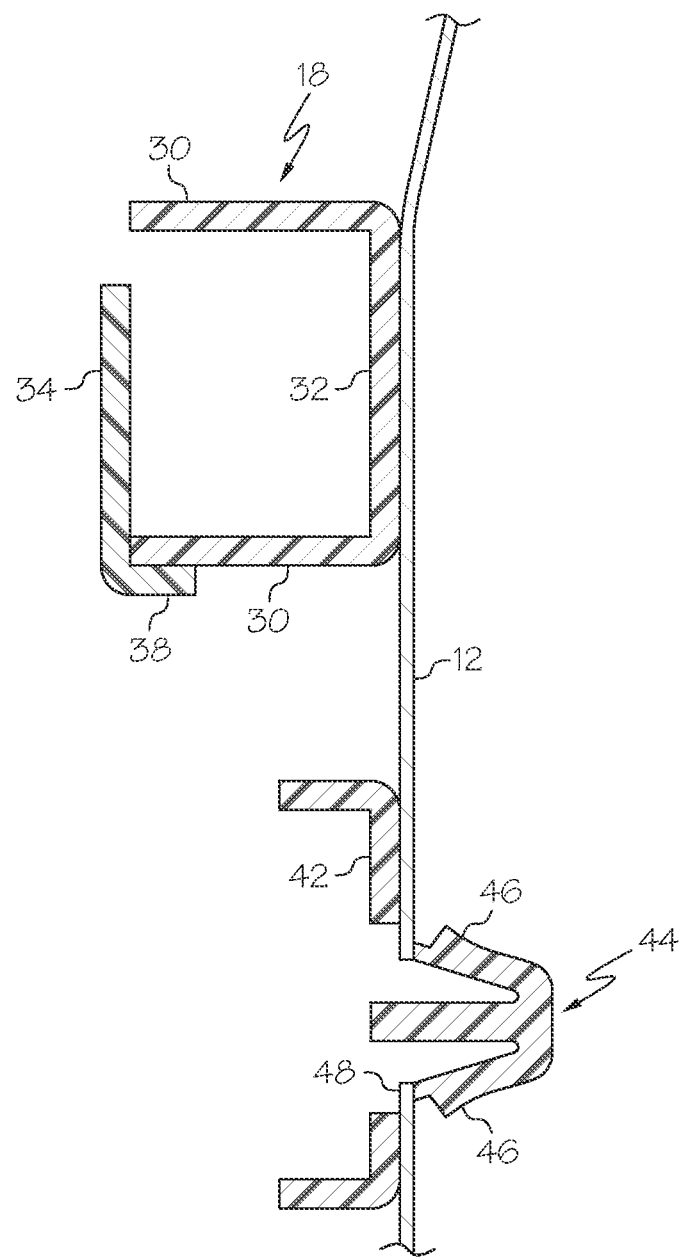
FIG. 4 is a cross-sectional view generally taken along line 4-4 in FIG. 3 with the retention strap in its closed position, similar to that seen in FIG. 2.

To retain the wire harness 14 within the channel 18, a retention strap 34 is provided. The retention strap 34 (perhaps best understood with reference to FIGS. 3 and 4) is unitarily formed with one side wall 30 of the channel 18 by way of a living hinge 36. The opposing end of the retention strap 34 is formed with a lip 38 configured to engage with a catch 40 formed on the opposing side wall 30 of the channel 18. Once the wire harness 14 has been positioned within the channel 18, the retention strap 34 folded over the passageway of the channel 18 such that the lip 38 engages the catch 40, thereby locking the wire harness 14 in position. As seen in the figures, the retention strap 34 is generally positioned in the second bend 26 of the channel 18. It will be readily appreciated, however, that the retention strap 34 could alternatively be positioned at other locations along the channel 18.

To secure the body of the wire harness holder 10 to the panel 12, a mounting flange 42 is provided. The mounting flange 42 in the illustrated embodiment is located along the outer sidewall 30 of the first bend 24 of the channel 18. The mounting flange 42 is generally an extension adjacent to the bottom wall 32 and has a fastener 44 unitarily formed therewith. The fastener 44 may be one of a variety of fasteners and is generally illustrated as an arrowhead-type fastener 44 having a pair of resilient tangs 46. In mounting the wire harness holder 10 to the panel 12, the tangs 46 of the fastener 44 are inserted through a corresponding opening 48 in the panel 12. As the tangs 46 pass through the opening 48, the tangs 46 are compressed towards one another and thereafter resiliently expand outward so as to engage the perimeter of the opening 48 and prevent withdrawal of the fastener 44 out of the opening, thereby securing the wire harness holder 10 to the panel 12.

To further secure the wire harness 14 to the body of the wire harness holder 10, the body is formed with a securement provision 50 located adjacent to one or both of the first and second ends 24, 28 of the channel 18. The securement provisions 50 (two being shown) are provided as angle brackets having a base wall 52 and a lateral wall 54 oriented at a right angle with respect to one another. The base wall 52 is generally formed as an extension of the bottom wall 32, while the lateral wall 54 is generally formed as an extension of one of the sidewalls 30. While provided with a right angle orientation, it will be appreciated that the base wall 52 and lateral wall 54 could be provided with angular orientations that are greater or lesser than 90°. Additionally, the securement provisions 50 could be formed as a single member. In the latter construction, only one of either the base wall 52 or lateral wall 54 is provided and the other is omitted.

The free lateral edges of the base wall 52 and the lateral wall 54 are formed with a lip 56 at their distal ends. Since the lip 56 is an abutment projecting in the plane of the base wall 52 or lateral wall 54, it results in the defining of a recessed edge 58 along the free lateral edges, between the lip 56 and the channel 18. The recessed edges 58 cooperates with the lips 56 to facilitate the application of tape (not shown) around the wire harness 14, thereby securing the wire harness 14 to the securement provisions 50. The lips 56 and recessed edges 58 minimize the possibility that the applied tape could inadvertently slide or be pulled off of the end of the securement provisions 50.

To facilitate the functioning of the first bend 22 in forming the drip loop 20, the bend 22 may be provided with drain opening 60 formed in either the bottom wall 32 or lowermost sidewall 30 (in the installed position). In conjunction with features of the panel 12 that are beyond the scope of the present disclosure, the drain opening 60 helps to facilitate the handling and management of water that may infiltrate the interior of the door in which the wire harness holder 10 is mounted so as to minimize any potential damage caused by the water.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

We claim:

1. A wire harness holder for securing a wire harness to a panel, the wire harness holder comprising:
   a body including a fastening portion to fasten the body to the panel, a channel to receive the wire harness therein, the channel extending in a serpentine configuration so as to form a drip loop portion therein, the channel being defined by a pair of opposed side walls connected by a bottom wall, the channel further being open along a side opposite of the bottom wall, the body further including a retention strap for facilitating retention of the wire harness within the body; and
   the body having a drain opening at the drip loop formed through the bottom wall and interior to one of the pair of opposed side walls;
   wherein the serpentine configuration forming the drip loop includes a first bend and a second bend;
   wherein the drain opening is located in the first bend and the retention strap is located in the second bend.

2. The wire harness holder of claim 1, wherein the second bend generally reverses a direction defined by the first bend.

3. The wire harness holder of claim 1, wherein the first bend forms a bend of about 90° bend and the second bend forms a bend of about 180°.

4. The wire harness holder of claim 1, wherein the body includes a securement provision located at one end of the channel.

5. The wire harness holder of claim 4, wherein the securement provision includes a wall having a protruding lip and a recessed edge adjacent to the protruding lip, the recessed edge being located between the lip and the channel.

6. The wire harness holder of claim 5, wherein a second securement provision is provided at an opposing end of the channel.

7. The wire harness holder of claim 4, wherein the securement provision is formed by a pair of angled walls, at least one of the walls including a protruding lip and a recessed edge adjacent to the protruding lip, the recessed edge being located between the lip and the channel.

8. The wire harness holder of claim 7, wherein the walls are generally perpendicularly oriented walls.

9. The wire harness holder of claim 1, wherein the fastening portion includes a pair of resiliently flexible tangs projecting in a direction generally away from the open side of the channel.

10. The wire harness holder of claim 1, wherein the body is configured such that the drip loop portion of the channel is positioned vertically lower than an adjacent portion of the channel when the body is in an installed position secured to the panel.

11. The wire harness holder of claim 1, wherein the retention strap being connected to one side wall of the channel via a live hinge and being releasably engageable with the other side wall of the channel so as to extend over the open side of the channel.

12. A wire harness holder for securing a wire harness to a panel, the wire harness holder comprising:
   a body including a fastening portion to fasten the body to the panel, a channel to receive the wire harness therein, and first and second securement provisions to secure the wire harness to the body, the channel extending between the first and second securement provisions in a serpentine configuration forming a drip loop, the channel being defined by a pair of opposed side walls connected by a bottom wall, and the channel being open along a side opposite of the bottom wall; and
   the body having a drain opening at the drip loop formed through the bottom wall and interior to one of the pair of opposed side walls;
   wherein the serpentine configuration forming the drip loop includes a first bend and a second bend;
   wherein the drain opening is located in the first bend and a unitarily formed retention strap located in the second bend.

13. The wire harness holder of claim 12, wherein the second bend generally reversing a direction defined by the first bend.

14. The wire harness holder of claim 12, wherein the first bend forms a bend of about 90° bend and the second bend forms a bend of about 180°.

15. The wire harness holder of claim 12, wherein the first and second securement provisions include a wall having a protruding lip and a recessed edge adjacent to the protruding lip, the recessed edge being located between the lip and the channel.

16. The wire harness holder of claim 12, wherein the first and second securement provisions are formed by pairs of angled walls, at least one of the walls including a protruding lip and a recessed edge adjacent to the protruding lip, the recessed edge being located between the lip and the channel.

17. The wire harness holder of claim 12, wherein the body is configured such that the drip loop portion of the channel is positioned vertically lower than an adjacent portion of the channel when the body is in an installed position secured to the panel.

18. The wire harness holder of claim 12, wherein the retention strap being connected to one side wall of the channel via a living hinge and being releasably engageable with the other side wall of the channel so as to extend over the open side of the channel.

* * * * *